F. S. CHAPMAN.

SOLDERING DEVICE.

APPLICATION FILED MAR. 5, 1910.

Reissued Mar. 21, 1911.

13,219.

Witnesses:

Ira D. Perry

P. Truman

Inventor:

Frank Spencer Chapman

By O R Barnett

Atty.

UNITED STATES PATENT OFFICE.

FRANK SPENCER CHAPMAN, OF TOLEDO, OHIO, ASSIGNOR TO THE NATIONAL ELECTRIC SPECIALTY COMPANY, OF TOLEDO, OHIO, A CORPORATION OF OHIO.

SOLDERING DEVICE.

13,219. Specification of Reissued Letters Patent. Reissued Mar. 21, 1911.

Original No. 934,711, dated September 21, 1909, Serial No. 457,976. Application for reissue filed March 5, 1910. Serial No. 547,622.

*To all whom it may concern:*

Be it known that I, FRANK SPENCER CHAPMAN, a citizen of the United States, and a resident of Toledo, in the county of Lucas and State of Ohio, formerly of Kenton, in the county of Hardin, in said State, have made certain new and useful Improvements in Soldering Devices, of which the following is a specification.

My invention relates to improvements in means for soldering metallic parts and is especially applicable to those joints used in electrical constructions which require a good metallic contact in order to provide against undue resistance to the electric current in the conductors at their point of union.

An object of my invention is to provide a device which does away with the necessity of using a furnace or torch or a soldering iron.

A further object of my invention is to provide a self soldering union for electrical conductors which may be easily applied and which requires no tools for the completion of a good joint.

Other objects and advantages will appear in the following specification and will be particularly pointed out in the appended claims.

My invention is illustrated in the accompanying drawings, in which—

Figure 1:
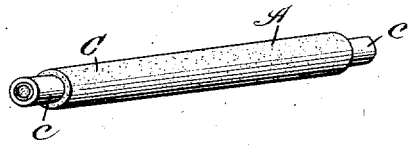
Figure 2:
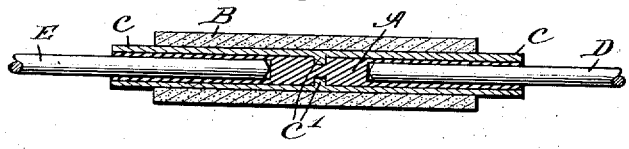
Figure 3:
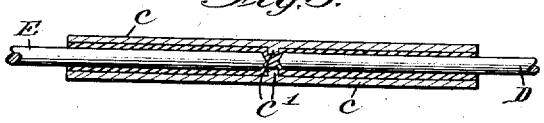
Figure 4:
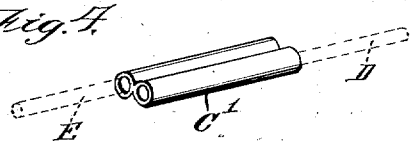
Figure 5:
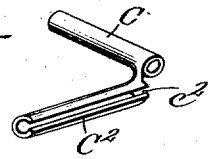
Figure 6:
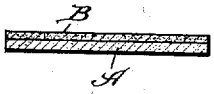

Figure 1 is a view of a union embodying my invention. Fig. 2 is an enlarged sectional view of the union showing two wires before soldering. Fig. 3 is a similar view showing the completed joint. Fig. 4 is a modified form of union. Fig. 5 is a view of a branch union, and Fig. 6 is a sectional view of a piece of the soldering material.

In carrying out my invention in one manner I take a sheet of solder A (Fig. 6) which may be ordinary lead and tin solder, brazing material, zinc or any suitable material and cover it with a layer B of a compound having high calorific power when burned. This layer is preferably a mixture of potassium chlorate, nitrate of strontium and powdered shellac in suitable proportions. This is made into a paste and applied to the solder. The resulting sheet may be rolled into sticks or cut up into strips as desired.

In using the solder, the surface of the metal to be soldered is first scraped and a flux applied in the usual manner. A piece of the solder with its inflammable coating is then placed on the joint and the heating compound is lighted with a match. It ignites readily and gives an intense heat which melts the solder, thus causing it to adhere to the surface to be soldered, and doing away with the need of either furnace or soldering iron.

In joining the ends of two wires, I may make use of a union C (Figs. 1, 2 and 3). This consists of a metal tube $c$ having preferably inwardly projecting lugs or flanges $c'$ near its central part. The tube may then be filled with solder A which is cored out at both ends to permit the entrance of the wires D and E; or any other suitable arrangement of the solder within the union may be made. Outside of the tube there is a coating of heating material B. In effecting the joint the wires are first inserted and then the compound B is ignited. During its combustion the heat is conducted to the solder within, which melts and allows the wires to be pushed together until they meet the stops $c'$. The solder is squeezed around the ends of the wires and comes into intimate contact with them. After cooling the joint presents the appearance shown in Fig. 3 in which the wires D and E are embedded fast in the metal. When the body of the solder is given the form above described, the coatings of solder, or they may be of other material having similar properties, on the inner surfaces of the tube $c$ at each side of the main body of solder at the center of the tube, perform not only the primary cementing function of a solder, but also form coverings for the inner surfaces of the tube which protect the same until the time when the union is used and which insure the proper adhesion of the solder to the tube when the solder at the center of the tube is squeezed around the ends of the wires, as above described.

Instead of the union just described, I may use one like that in Fig. 4. This consists of two integral tubes C′ having an inner lining of solder and an outer lining of heating material. The wires D and E are inserted into the tubes from their opposite ends and are soldered in the manner already described.

In Fig. 5 I have shown a union for a branch wire. This consists of a split tube $C^2$ and an integral tube $C^3$ disposed at an angle thereto. In use the main wire may be placed in the tube $C^2$ by passing it through the slit $c^2$, while the end of the branch wire is placed in the tube $C^3$. The inflammable coating is ignited and the linings of solder are melted and flow over the wires, thus forming a good conducting joint.

I claim:

1. In a soldering device, a metallic tube having an interior lining of soldering material and an outer coating of inflammable material.

2. In a soldering device, a metallic tube provided with interior stops, a coating of inflammable material on the outside of said tube, and a lining of soldering material on the inside of said tube.

3. In a soldering device, a metallic union forming element, a body of soldering material within said element, and a coating of inflammable material on the outside of the same.

4. In a soldering device, a metallic tube, a body of soldering material within said tube, and a coating of inflammable material on the outside of the same.

5. In a soldering device, a metallic tube, a body of soldering material in the center portion of said tube and a coating of inflammable material on the outside of the same; the interior surfaces of the tube at each side of said body of soldering material being covered with a lining for the purpose described.

6. In a soldering device, a metallic union forming element, a body of soldering material within said element and a coating of inflammable material on the outside of the same; the inner surface of said union forming element being covered with a lining for the purpose described.

7. The combination of a body of soldering material, a body of inflammable material and a metallic union forming element, which are in operative juxtaposition and permanently united so as to form a unitary soldering device.

8. The combination with a body of soldering material, of metallic means in which said body is contained and a body of inflammable material on the outside of said containing means which is permanently united thereto so that the whole forms a unitary soldering device.

9. In a soldering device, the combination with a body of soldering material, of metallic means in which said body is contained, and a coating of inflammable material on the outside of said containing means.

10. A soldering device, comprising in combination a metal tubular element containing a body of solder, and a coating of inflammable material on the outside of and permanently attached to said tube, so as to impart the heat necessary for melting said solder.

FRANK SPENCER CHAPMAN.

Witnesses:
C. F. WALL,
C. J. NOLAN.